(12) United States Patent
Piispanen et al.

(10) Patent No.: US 6,233,990 B1
(45) Date of Patent: May 22, 2001

(54) METHOD FOR MANUFACTURING A FORMED PIECE OF METAL

(75) Inventors: Ari Juhani Piispanen, Lappeenranta; Timo Kässi, deceased, late of Launonen, both of (FI), by Leena Kässi, heir

(73) Assignee: Rondex Oy Ltd., Helsinki (FI)

( * ) Notice: Subject to any disclaimer, the term of this patent is extended or adjusted under 35 U.S.C. 154(b) by 0 days.

(21) Appl. No.: 09/029,596

(22) PCT Filed: Jul. 1, 1996

(86) PCT No.: PCT/FI96/00385

§ 371 Date: Jul. 9, 1998

§ 102(e) Date: Jul. 9, 1998

(87) PCT Pub. No.: WO97/09136

PCT Pub. Date: Mar. 13, 1997

(30) Foreign Application Priority Data

Sep. 5, 1995 (FI) .......................................................... 954161
Mar. 19, 1996 (FI) ......................................................... 961265

(51) Int. Cl.⁷ ................................................................. B21K 27/06
(52) U.S. Cl. .................................... 72/70; 72/115; 72/330
(58) Field of Search ................................. 29/417; 72/70, 72/84, 67, 115, 330, 331, 339

(56) References Cited

U.S. PATENT DOCUMENTS

| 674,769 | * | 5/1901 | Hughes | 72/330 |
| 965,039 | * | 7/1910 | Slick | 72/84 |
| 2,290,554 | | 7/1942 | Hack . | |
| 3,187,421 | * | 6/1965 | Feldmann et al. | 29/417 |
| 4,846,029 | | 7/1989 | Gardner . | |
| 5,430,928 | | 7/1995 | Flammang . | |

FOREIGN PATENT DOCUMENTS

| 715630 | 12/1941 | (DE) . |
| 2420895 | 11/1974 | (DE) . |
| 75730 | 4/1988 | (FI) . |

OTHER PUBLICATIONS

Patent Abstract of Japan, vol. 10, No. 138, Abstract of JP, A, 60–261635, Dec. 24, 1985.

* cited by examiner

*Primary Examiner*—Lowell A. Larson
(74) *Attorney, Agent, or Firm*—Altera Law Group, LLC

(57) ABSTRACT

The present invention relates to a method for manufacturing a formed piece of aluminum or some other relatively soft metal. In accordance with the invention, a slice is cut form a rod of aluminum or some other raw-cast metal; the slice forms a blank (3), which is placed on the mould surface (10) of a mould tool (5) rotating about its axis (4), and which is formed using a roll forming tool rotating about its axis (6) inclined to the axis of the mould tool and being in linear rolling contact with the blank surface. The blank is then formed to a substantially disc-shaped piece of plate between the opposite rotating tools (5, 7). The method may be part of the manufacturing process of a frying pan or kettle so that the roll formed piece may comprise the bottom and collar of the utensil, which is bent to form the sides of the cooking utensil at the next pressure turning stage; or, alternatively, the roll formed piece may be fastened as the bottom to a separately manufactured utensil by linear pressing. The formed piece may also be deep-drawn to a globe of a street light, or it may be used as a traffic sign, or as a lid for a soft-drink can.

16 Claims, 6 Drawing Sheets

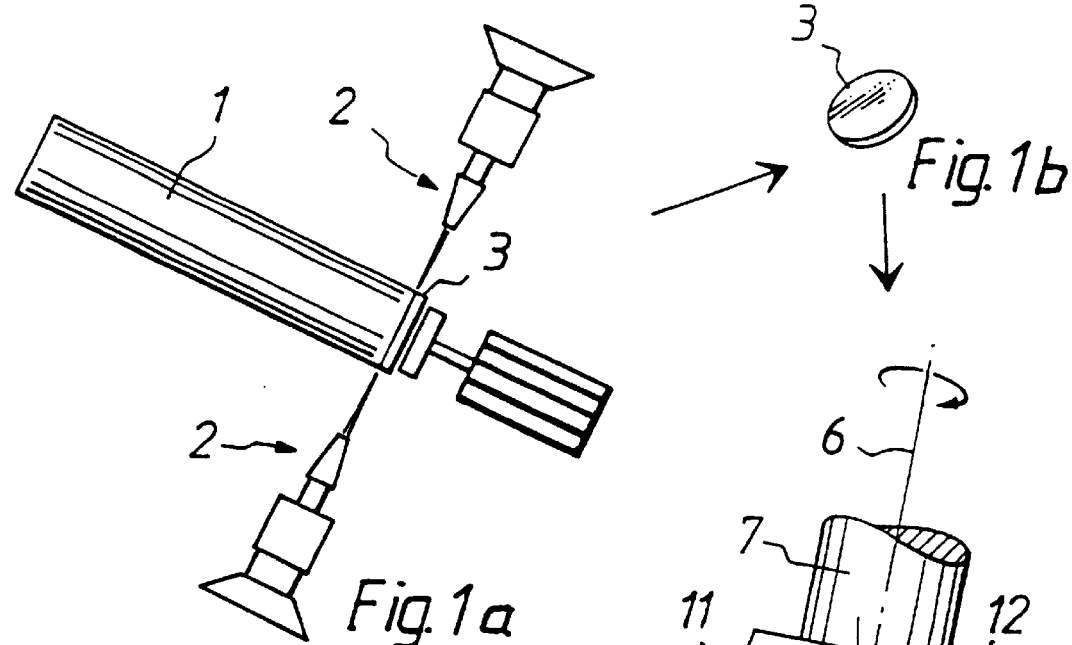
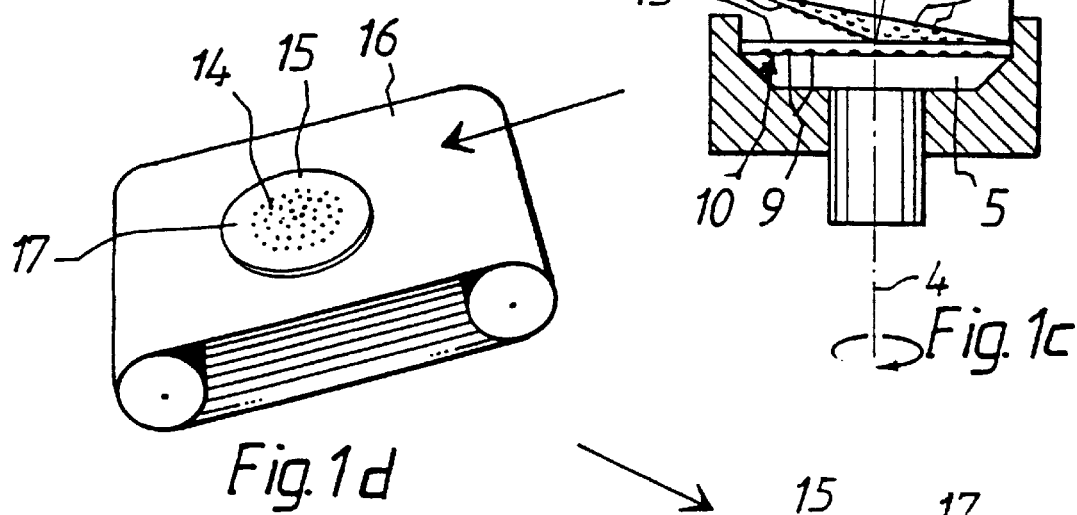
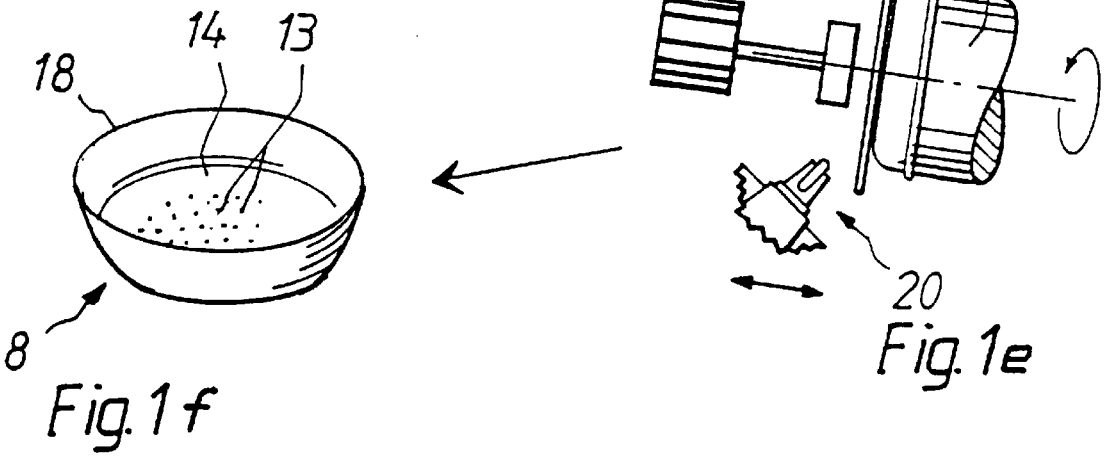

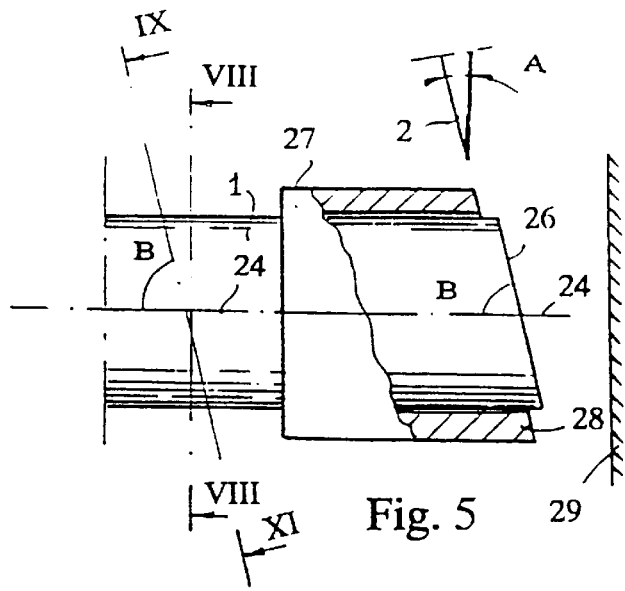
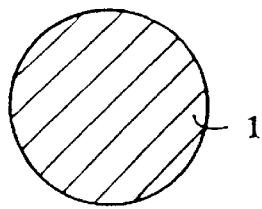
Fig. 5　Fig. 8
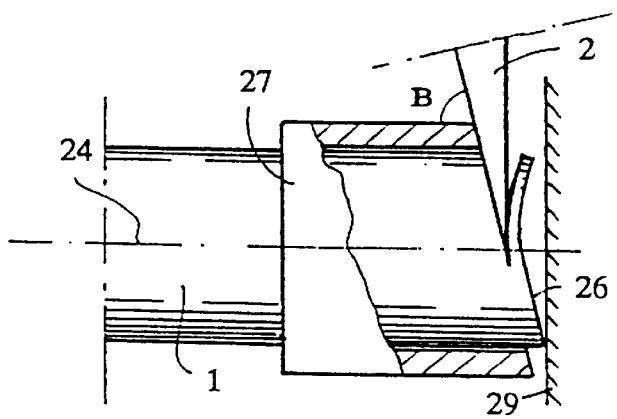
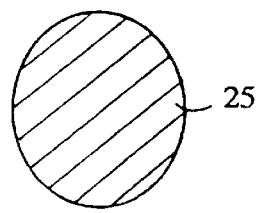
Fig. 6　Fig. 9
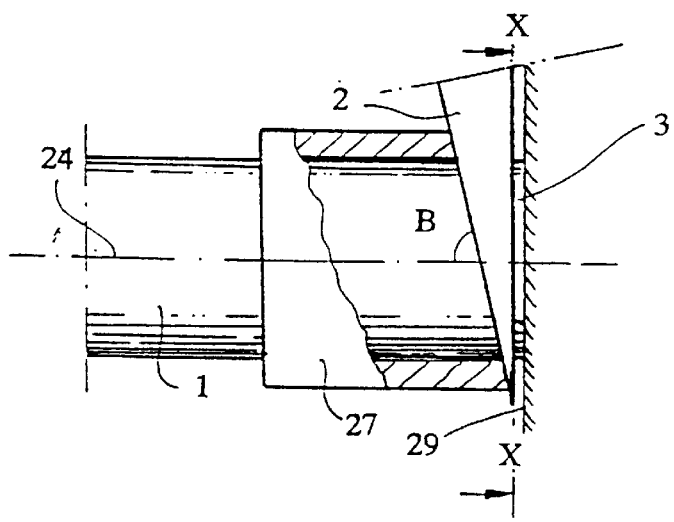
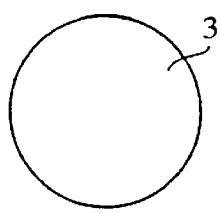
Fig. 7　Fig. 10

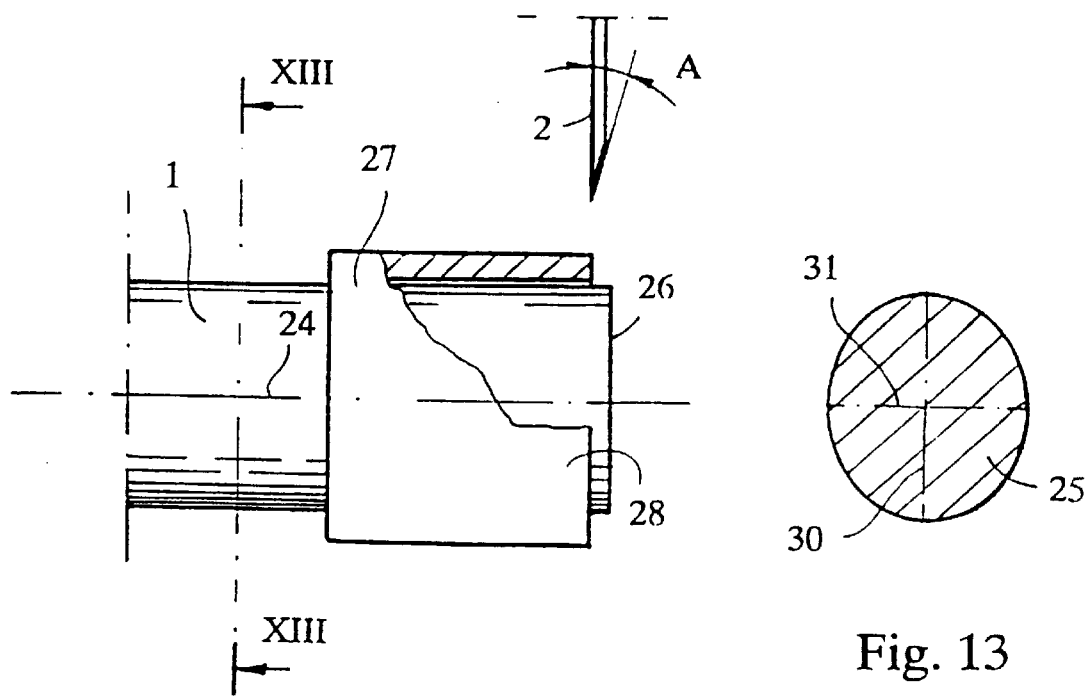
Fig. 11
Fig. 13
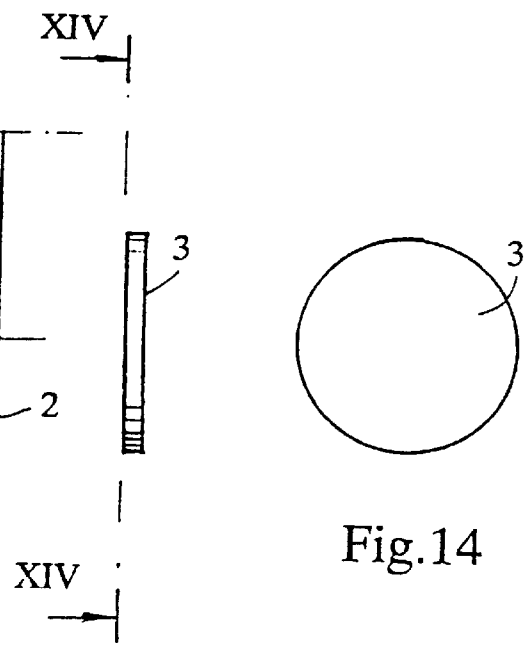
Fig. 12
Fig. 14

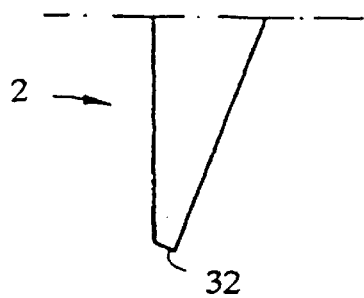 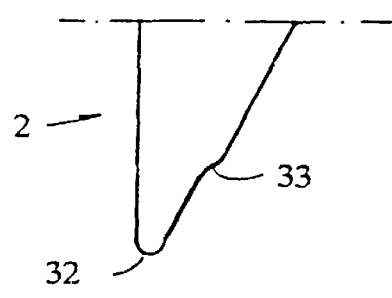
Fig. 15  Fig. 16
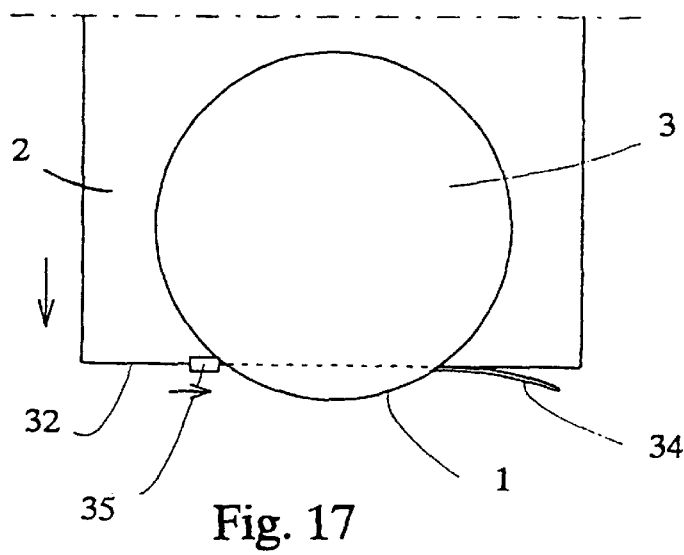
Fig. 17
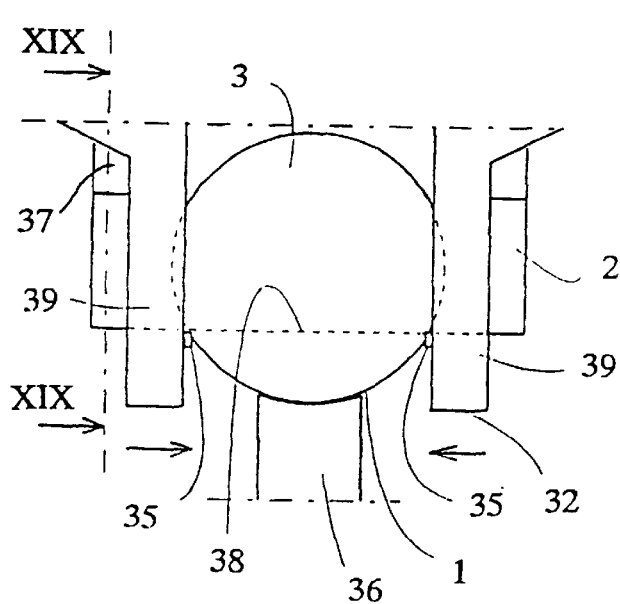 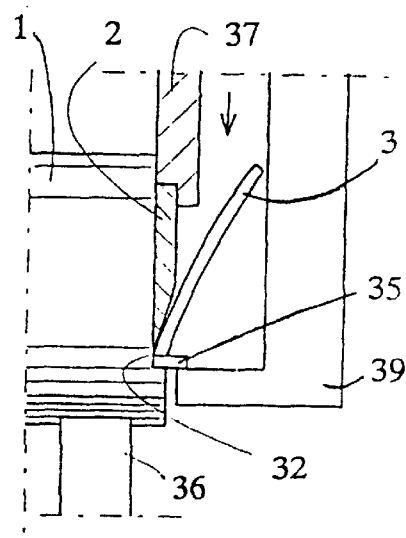
Fig. 18  Fig. 19

METHOD FOR MANUFACTURING A FORMED PIECE OF METAL

FIELD OF THE INVENTION

The present invention relates to a method for manufacturing a formed piece of aluminium or some other relatively soft metal. Especially, the present invention relates to the manufacture of such a piece of metal, which as such is suitable to be used as the bottom of a cooking utensil, such as a frying pan or a kettle, or which forms a blank which can be machined further by turning e.g. to a cooking utensil, lamp globe, a traffic sign, lid for a soft-drink can, etc.

1. Description of Related Art

Until now, frying pans and similar utensils for the preparing of food have been manufactured of a metal blank by pressure turning. In this method, the blank in form of a plate is fastened to a rotating mandrel so that the inner bottom of the pan being manufactured is placed against the support surface of the mandrel, whereafter the sides of the pan are formed by using a turning tool to bend the sides of the blank against the sides of the mandrel acting as a mould.

It is also known to manufacture kettle bottoms in the shape of a plate e.g. of aluminium; these are connected to a kettle made of another material, e.g. stainless steel, by pressing.

A drawback of the prior art manufacture of cooking utensils has been the expensiveness of the metal blank forming the utensil or its bottom. In addition, the patterning and finishing of the bottom have been done either by chipping with a lathe or by pressing in a manufacturing process including many stages, which is both expensive and time-consuming. Also waste of material has raised the costs of the process.

2. Summary of the Invention

It is thus an object of the present invention to provide a new solution for machining a piece of aluminium or some other metal which can be formed in a similar way so that the manufacturing process, e.g. when manufacturing cooking utensils, is made less expensive and simpler than the known prior art solutions. It is characteristic of the method of the present invention that a slice is cut from a raw-cast rod of said metal; it forms a blank which is roll formed by placing it on a moulding tool rotating about its axis to rotate with the tool and by forming it from its opposite side with a rolling tool rotating about its axis, the said tool being in linear rolling contact with the blank and inclined to the axis of the mould tool, thus forming the blank between the opposite rotating tools to a substantially disc-shaped piece of plate.

Roll forming is a method of cold forming, which is based on the plastic deformation of metal, and in which a roll forming tool forms and distributes metal in a way comparable with the rolling of dough. Thus, it is typical for roll forming that, on the area to be formed, the blank expands at the same time as its material thickness grows smaller. Thus, the blank can be formed to a shape corresponding to the mould surfaces of the tool in one single stage so that no waste is generated in the process.

In accordance with the present invention, the use of raw-cast metal as raw material in the roll forming process, e.g. when manufacturing cooking utensils, means a substantial saving in costs, compared with the known method of pressure turning, in which the blank to be turned to a utensil or its bottom is thin rolled metal. For example, in case of aluminium, the crude metal provided by a foundry is approximately 30% cheaper than a rolled product. The blanks to be roll formed are cut as slices e.g. from a rod cast in the shape of a cylinder so that they are easily roll formable to circular disc-shaped pieces of plate, which can form the bottom of a cooking utensil or e.g. the shield of a traffic sign finished into its final shape.

The present invention makes it possible for the piece of plate to be patterned either from its one side or both sides in connection with roll forming with the help of elevations and/or recesses occurring on the rolling surface. Thus, the patterns are produced directly during the roll forming process, and no separate turning or pressing stages are required. Roll forming places no restrictions for the patterns of the surface facing the mould tool, because the blank remains on the mould tool during forming, following completely the shapes of the surface. On the opposite side of the piece, facing the roll forming tool, it is possible to freely form annular elevations and recesses with the help of the similar shapes on the tool surface. In case of other patterning, one must be certain that the movement of the rolling surface of the roll forming tool and that of the surface of the rotating blank are synchronized e.g. within a suitable sector division of the surfaces so that corresponding surface patterns match each other all the while during the forming process. This is dependent e.g. on the cone angle of a suitably tapered roll forming tool and on the angle of deflection between the axes of the roll forming tool and the mould tool having a substantially planar mould surface, the possibilities and solutions concerning which are obvious to those skilled in the art.

For example, the following patterns can be formed by roll forming: grease pockets for the inner bottom of frying pans, markings of the manufacturer, product, etc. in the bottom of a cooking utensil, or radial reinforcing ribs used e.g. in a traffic sign or on the lid of a soft-drink can.

The blank which is cut from a raw-cast rod and which may be e.g. cylinder-shaped, does not necessarily have to be a circular, uniformly thick slice, because, irrespective of the original shape of the blank, in the forming process, the blank forms itself to the desired disc-shape like a rollable dough. However, it is of advantage, if the blank's shape resembles as much as possible the circular, disc-like shape, to which the blank is formed during the roll forming process of a piece of plate. If the blanks are formed by slicing a raw-cast metal rod so that a rod with circular cross-section is cut in a perpendicular direction, the blanks to be cut tend to deform and flatten out in the cutting direction so that they become elliptical in shape. This is a manufacturing-technical disadvantage, because, in the next roll forming stage, the piece must be returned to its circular shape which the blank would originally have had without the said deformation.

However, the problem described above can be solved in accordance with preferred embodiments of the present invention so that disc-shaped slices are cut from a metal rod of circular or elliptical cross-section by directing the cutting tool to the rod in such a way that the cut profile of the rod is elliptical in shape, but that the slice of metal detached from the rod becomes substantially circular, due to flattening occurring in the cutting direction. Then it has been achieved by simple methods that, irrespective of the deformation occurring in the metal material, the cut blank is circular and thus ideal for the next roll forming stage. In roll forming, the blank deformations occur mainly radially and evenly in various directions, and the blank is able to find the shape of the final utensil fast and with as little material transitions as possible. This accelerates the forming process, improves its profitableness and maximizes its capacity in serial production.

The simplest way to produce a substantially circular, disc-shaped blank is to cut a slice from a metal rod with circular cross-section by directing a cutting tool to the rod obliquely to its axial direction. In the invention, it is thus possible to use standard-form crude metal rods cast to the shape of a cylinder without it being in any way necessary to modify the shape of the rod. Alternatively, the metal rod may be of elliptical cross-section, and a piece or a blank is cut by directing the cutting tool to the rod perpendicularly to its axis from the direction of the great axis of the ellipse. Also combinations of these two methods are applicable within the scope of the present invention.

The angle, at which the cutting tool is directed to a metal rod of circular cross-section, may be for example about 60–80°, preferably about 60–70° to the axial direction of the rod. If the cross-section of the axis is elliptical, and the cutting tool is directed to the rod perpendicularly, the great axis of the ellipse has to be about 1.06–1.16 times the minor axis for the rod to have substantially the corresponding cut profile. However, these parameters are substantially dependent on the cutting conditions, especially on the characteristics of the cutting tool, and a person skilled in the art may in each case by trying easily define e.g. the angle, at which the cutting tool has to be directed to a rod of circular cross-section in order to get the desired, substantially circular disc-shaped blank.

A typical metal used for the bottom of a cooking utensil is aluminium which, because of its softness, is well suited for cutting and roll forming. Knifelike or wedgelike cutting blades manufactured of a harder metal than aluminium, such as steel, are suitable for cutting tools. The speed of the blade may be e.g. 25–150 mm/s, preferably about 100 mm/s, although the speed does not have a large effect on the final result.

According to an embodiment of the present invention, the rod is supported from the side of the end to be cut with a casing in form of a sleeve surrounding the rod. The side of the casing acts then as a guide for the cutting blade.

On the other hand, it has been discovered while testing the invention that, after the cutting of a rod of soft metal has advanced past the centre of the rod to the narrowing area of the cut profile, protruding moustache-like flashes are easily formed to the side of the cut slice, and they have to be cut of from the blank meant to be roll formed. However, it is possible to avoid the formation of such moustaches so that at the final stage of the blade movement, cutting of the rod is guided with stopping pieces, which are pressed against the sides of the cut slice and which move in the direction of the blade edge. These stopping pieces support the sides of the rod and the detaching slice in the cutting line, forming simultaneously a physical barrier to flash formation.

According to another preferred embodiment of the present invention for facilitating the roll forming process of a blank, the slice detaching from the end of the rod or the blank is allowed to press between the cutting blade and a wall perpendicular to the rod in order to straighten the slice. Without this measure, the slice forming the blank would remain concave after cutting, and would thus be more difficult to roll form.

In the roll forming process following the cutting of the blank, the blank can be formed to a disc-shaped piece between the principally planar mould tool rotating about its axis and the suitably tapered roll forming tool, which rotates about its axis and is in linear rolling contact with the blank; the centre of the disc-shaped piece may form the bottom of a cooking utensil with a surrounding collar which is bent by turning to form the upwards rising sides of the utensil. The utensil may also be finished by deep drawing. Alternatively, the blank may be roll formed to a bottom of a utensil, whereafter it is fastened to the utensil by pressing; the utensil may be manufactured of some other metal than the roll formed bottom. A typical embodiment is to provide a kettle of stainless steel separately with a roll formed aluminium bottom.

In connection with the embodiments of the invention relating to the manufacture of a cooking utensil, it is also possible to join a magnetic, induction-heatable metal part to the blank, which part integrates with the bottom of the cooking utensil during roll forming. With this solution, it is possible to avoid a separate pressing stage which also results in a product of poorer quality than roll forming.

Besides cooking utensils, the manufacturing method of a piece of metal of the invention comprising roll forming may also be used for other purposes where the formed pieces preferably have to be circular, because of their use or efficient further processing. An embodiment of the present invention comprises aluminium light globes, e.g. for street lights, which are manufactures from blanks cut from an aluminium rod by roll forming and which then are processed by pressure turning, or by pressing, deep drawing, or some other similar method.

Other similar preferable applications are traffic signs or other signposts, which are manufactured from blanks cut from a crude metal rod and roll formed to disc-shaped pieces of plate suitably equipped with radial reinforcing ribs; the said pieces of plate are then ready to be painted and fastened to their shafts. The shaft fasteners may be provided as part of the roll forming process. In accordance with the invention, lids for cans, such as beer or soft-drink cans, can be manufactured correspondingly by roll forming, whereafter they can be fastened to the cans by seaming. Also in this case, the radial reinforcing ribs are produced advantageously during roll forming.

BRIEF DESCRIPTION OF THE DRAWINGS

In the following, the present invention is described in more detail referring to the attached drawings, in which FIGS. 1(a–f) shows a process of the invention for the manufacture of a frying pan, in which a blank is cut from a crude metal rod; the blank is formed by roll forming to a disc-shaped piece forming the bottom of the pan, and the sides of the pan are bent by pressure turning;

FIGS. 5–7 show the various stages of cutting a disc-shaped slice obliquely from a metal rod of circular cross-section;

FIG. 8 is a sectional view of the circular cross-section of the rod along the line VIII—VIII of FIG. 5;

FIG. 9 is a sectional view of the elliptical cut profile of the rod along the line IX—IX of FIG. 5;

FIG. 10 is a view of a disc-shaped slice cut from the rod as seen from the line X—X in FIG. 7;

FIGS. 11–12 show the various stages of cutting a disc-shaped slice from a metal rod of elliptical cross-section;

FIG. 13 is a sectional view of the elliptical cross-section of the rod along the line XIII—XIII of FIG. 11;

FIG. 14 is a view of a disc-shaped slice cut from the rod as seen from the line XIV—XIV of FIG. 12;

FIGS. 15 and 16 illustrate the shape of a cutting tool blade used for cutting the rod, in accordance with two different applications;

FIG. 17 shows schematically the cutting of a rod, in which a stopping piece pressing the one side of the slice detaching from the rod has been connected to the cutting blade, and in which a moustache-like flash appears on the opposite site with no stopping piece;

FIG. 18 illustrates in more detail the cutting of the rod with a cutting blade, to which stopping pieces pressing both sides of the detaching slice are connected;

FIG. 19 is a sectional view of the cutting along the line XIX—XIX of FIG. 18;

DETAILED DESCRIPTION OF THE INVENTION

Figure 2:
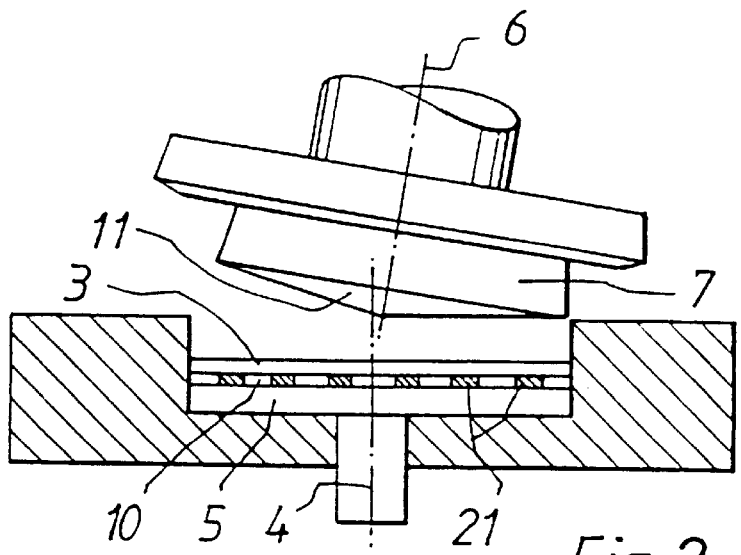
FIGS. 2 and 3 illustrate the manufacture of a kettle bottom by roll forming so that an induction-heatable metal net is attached to the bottom.

The starting point of the manufacturing process of FIG. 1 is a rod 1 of aluminium, which is unrolled and raw-cast to cylindrical shape; disc-shaped slices 3 are detached from it with a cutting tool 2 for roll forming blanks.

Roll forming of a blank 3 for forming the bottom part of a pan is carried out with an equipment comprising a mould tool 5 rotating about its axis 4 and a roll forming tool 7 rotating about its axis 6. The axis 6 of the roll forming tool 7 is inclined at an angle A to the axis 4 of the mould tool 5, i.e. to about 10°. The mould tool includes a flat, circular mould surface 10, except of small elevations 9 providing a pattern on the bottom surface of the pan 8. The roll forming tool 7 comprises a conical surface 11 with small knobbly elevations 12 for providing grease pockets 13 on the inner bottom surface 14 of the pan 8. Roll forming is conducted so that the blank 3 is placed on the mould surface 10 of the mould tool 5, which is made to rotate about its axis by a motor (not shown), and the roll forming tool 7, which is journalled to make it rotate freely, is placed against the blank rotating with the mould tool so that the movement of the blank makes it rotate about its axis 6, causing the roll forming tool to roll to the surface of the blank in radial and linear contact. The blank 3 is then formed to a disc-shaped piece 15 matching the mould surface 10 in the gap between the mould surface 10 of the mould tool and the conical surface 11 of the roll forming tool 7. The said piece 15 comprises the bottom 14 of the pan 8 to be manufactured, including also the elevations, recesses and other patterns.

In FIG. 1, the roll formed piece of plate 15 has been transferred to a conveyor belt 16, symbolizing the transfer of the piece from the roll forming stage to the following pressure turning stage. The centre 14 of the roll formed piece 15 forms the bottom of a finished pan 8, and the surrounding collar 17 is bent to form the sides 18 of the pan by pressure turning.

Pressure turning is carried out by a mandrel 19 rotating about its axis, its shape matching the inner surface of the pan 8 to be manufactured. A roll formed, disc-shaped piece of plate 15 is placed on the mandrel 19, and the collar 7 of the piece is bent against the mandrel surface using a turning tool 20 and a technology, which in itself is known in the manufacture of frying pans. The process results finally in the pan 8 shown in FIG. 1, to which only a handle has to fastened.

Figure 3:
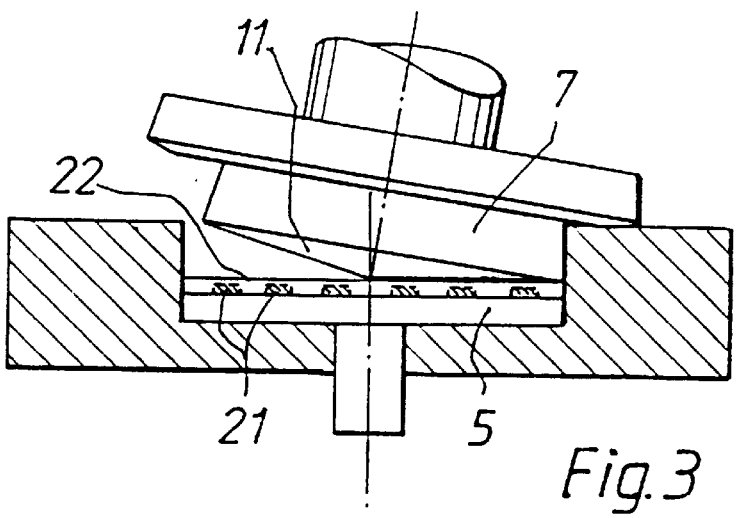
Figure 4:
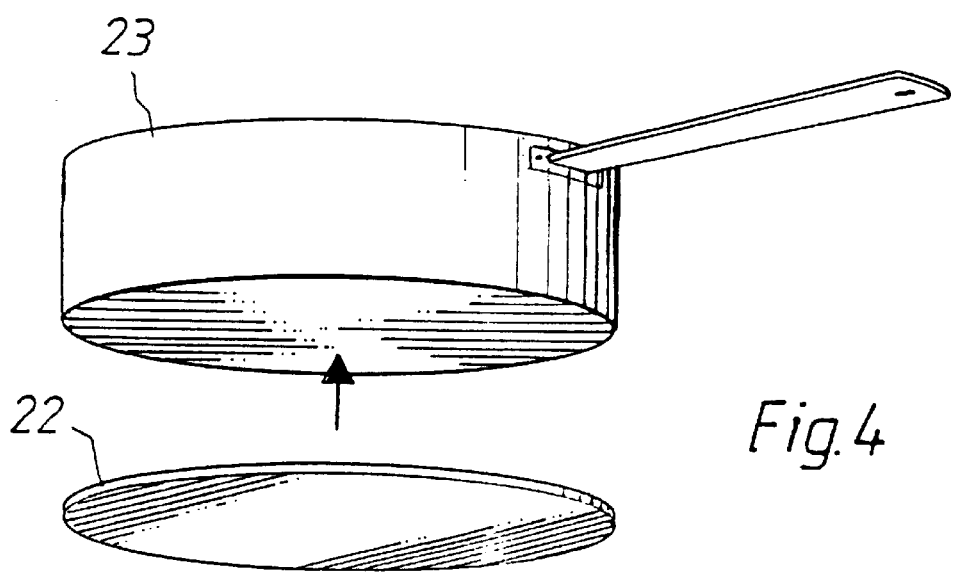
FIG. 4 illustrates the fastening of a bottom manufactured by roll forming to the kettle by pressing.

In FIGS. 2 and 3, there is shown the roll forming of a kettle bottom 22 comprising an induction-heatable metal net 21 using equipment which in broad outline corresponds with that shown in FIG. 1. Thus, the equipment includes a mould tool 5 rotating about its axis and with a circular, smooth mould surface 10, and a roll forming tool 7 rotating about its axis and with a smooth conical surface 11. A metal net 21 and an aluminium blank 3 to be formed are placed on the mould surface 10, in accordance with FIG. 2, whereafter roll forming according to FIG. 3 is performed, in which aluminium with plastic deformation properties penetrates the holes of the steel net 21 so that the net is integrated as part of the kettle bottom 22 to be formed. The bottom 22 equipped with such a roll formed, aluminium steel net 21 can then be fastened to a kettle made e.g. of stainless steel by linear pressing. Fastening of the bottom 22 manufactured by roll forming to the kettle 23 is shown schematically in FIG. 4. The parts 22, 23 are fitted together by linear pressing, as is shown by an arrow in the figure.

In FIG. 5, there is shown an unrolled rod of aluminium 1 which is cast to the shape of a circular cylinder and which has a circular cross-section as in FIG. 8. Circular, disc-shaped slices 3 according to FIG. 10 are cut from the rod 1, and they are roll formable to substantially circular, disc-shaped pieces of plate, which form the bottom of a cooking utensil, e.g. a frying pan. The roll forming may correspond e.g. with the process shown in FIG. 1.

A disc-shaped slice 3 is cut from the rod 1 by a wedgelike cutting tool 2 made of steel, the sides of which together form a cutting angle A of about 20°. The cutting blade 2 is directed to the side of the rod 1 at an angle B which is about 70° from the axial direction 24 of the rod. Thus, the cut profile of the rod is an ellipse 25 shown in FIG. 9. The rod 1 is supported on the side of the end 26 to be cut by a sleeve casing 27, the end 28 of which is inclined at an angle B to the axial direction 24 of the rod, corresponding to the cutting direction. The end 28 of the casing may thus act as a guide, against which the side of the cutting blade 2 rests during the cutting movement.

FIGS. 6 and 7 show the cutting movement stages of the cutting blade 2, at which the slice 3 is detached from the obliquely cut end 26 of the rod. During cutting, a soft metal material flattens in the cutting direction, but a cut performed obliquely to the axial direction 24 of the rod compensates the said flattening so that the detaching slice 3 is substantially circular, irrespective of the elliptical form of the cut end of the rod 1 and the corresponding cut profile.

During cutting, the rod 1 is pressed against the wall 29 extending axially perpendicularly to it so that the detaching disc-shaped slice 3 is pressed between the side of the wedgelike cutting blade 2 and the wall 29. This way it is achieved that the slice 3 thus produced is straight, which makes its processing faster at the next roll forming stage. If the wall 29 is missing, the slice 3 bending at the detachment stage would remain curved, which would make it more difficult to roll form.

The thickness of a slice 3 cut from the rod 1 and used as a blank, which is them formed to a frying pan, may be about 6–9 mm, and its diameter may be about 140–300 mm. During roll forming, the blank 3 expands radially so that the thickness of the bottom of a finished pan is e.g. about 5 mm.

In FIG. 11, which presents another embodiment of the invention, there is shown a cast aluminium rod 1 of elliptical cross-section, as shown in FIG. 13. The great axis 30 of the ellipse is about 1.15 times the minor axis 31. The disc-shaped slice 3, which is shown in FIG. 14, is cut from the end 26 of the rod 1 with a straight cutting blade 3 having a sharpened point, the cutting angle of which is about 10°. Cutting is performed perpendicularly to the axial direction 24 of the rod so that the cutting blade 2 cuts the rod in direction of the great axis 30 of the ellipse 25. Correspondingly, in this embodiment, the end 28 of the sleeve-like casing 27 supporting the rod 1 is perpendicular to the rod axis 24. The cutting movement of the blade 2 detaches a slice 3 according to FIG. 12 from the end 26 of the rod 1, which, due to flattening occurring in the metal in connection with the cutting, is substantially circular in shape, irrespective of the elliptical cross-section of the rod.

FIGS. 15 and 16 present two shapes of the point (cutting edge) 32 of the cutting blade 2, which are especially advantageous for the invention. In FIG. 15, a bevelling of about 0.3 mm is formed on the point 32 of the blade 2 on the (left) side where the rod 1 is situated. In FIG. 16, the point of the blade is rounded, the radius of curvature being about 2 mm, and a wavelike rounded step 33 is formed on the side of the detaching piece of the blade (the right side) about 12 mm away from the point of the blade.

In FIG. 17, there is illustrated a protruding, moustache-like flash 34, which is easily generated when cutting a rod 1 of soft metal, such as aluminium; the flash forms on the side of the slice 3 detaching from the rod after the point or the cutting edge 32 of the blade 2 has passed the centre of the rod. Such a flash 34 has to be detached from the blank before it is roll formed. In addition, FIG. 17 illustrates a solution according to the present invention for preventing the generation of such a flash; this solution comprises a stopping piece 35 moving in the direction of the cutting edge 32, e.g. perpendicularly to the cutting direction, which is kept pressed against the side of the detaching slice 3 at least during the latter half of the cutting movement, i.e. on the reducing section of the cut profile of the rod.

FIGS. 18 and 19 show in slightly more detailed form, the cutting of the rod 1 in accordance with the said solution. The rod 1 resting against the support 36 is cut with a cutting blade 2, the point of which is in shape of a wedge and which is situated on a supporting block 37, and which in the figures moves in the cutting direction, i.e. downwards. Two strip-like stopping pieces 35 moving in opposite directions on a cutting line 38 formed by two cutting edges 32 are connected to the cutting blade 2. The stopping pieces are attached to supporting blocks 39 moving in a similar way. During the cutting of the rod 1, the transfer mechanism (not shown) of the supporting blocks 39 holds the stopping pieces continuously against the rod and the sides of the slice 3 detaching from it, preventing thus the generation of the moustache-like flashes (part 34 in FIG. 17) on the opposite sides of the detaching piece because of deformation.

Figure 20:
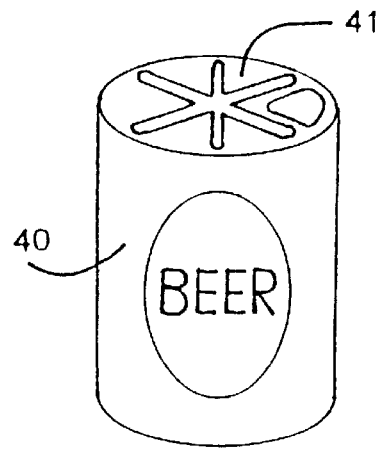
FIG. 20 shows a soft-drink can equipped with a lid manufactured according to the present invention.
Figure 21:
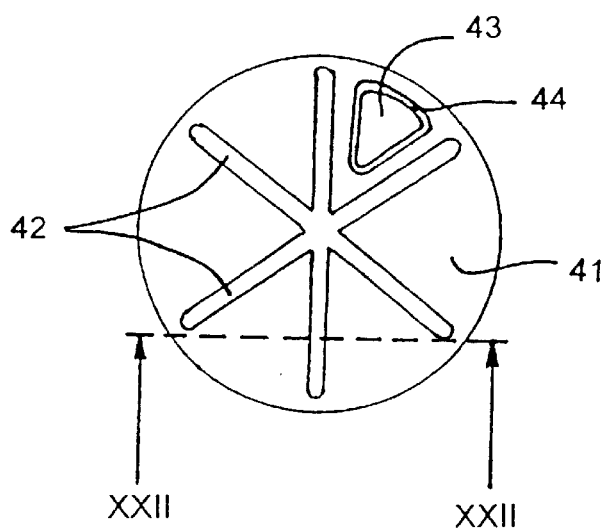
FIG. 21 is a top view of a roll formed lid of the can of FIG. 20.
Figure 22:
FIG. 22 is a section XXII—XXII of FIG. 21.

FIGS. 20–22 illustrate a disposable soft-drink can 40 made of metal and provided with a roll formed lid 41 manufactured in accordance with the present invention. A roll forming blank 3 is cut from the aluminium rod 1 and formed to a lid of FIG. 21 by a process which generally may correspond with the process presented in FIG. 1. In this case, the mould tool 5 is provided with radial recesses, which during roll forming form radial reinforcing ribs 42 shaped as expansions on the lid 41. Additionally, a tear-off opening 43 may be provided by making the lid thinner at the edges 44. For example, an annular tear-off grip is fastened by the opening separately by soldering. A special advantage of this method is that raw-cast aluminium is used in the manufacture, the aluminium being substantially cheaper than the lid materials presently in use.

Figure 24:
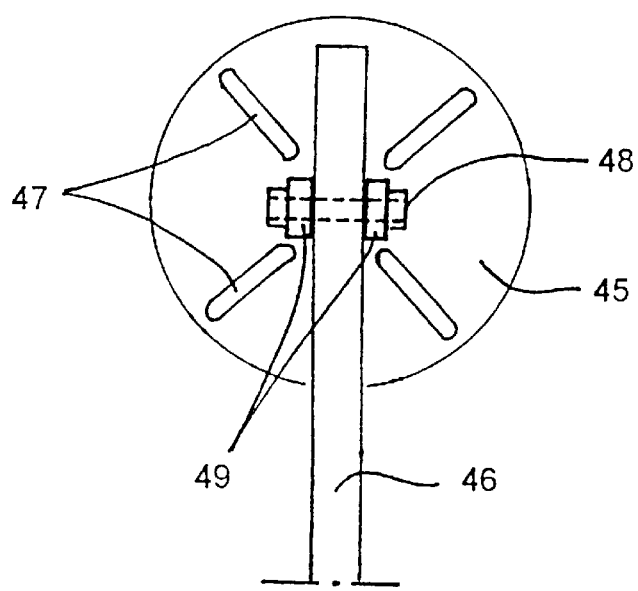
FIG. 24 is a back view of the sign of FIG. 23.
Figure 23:
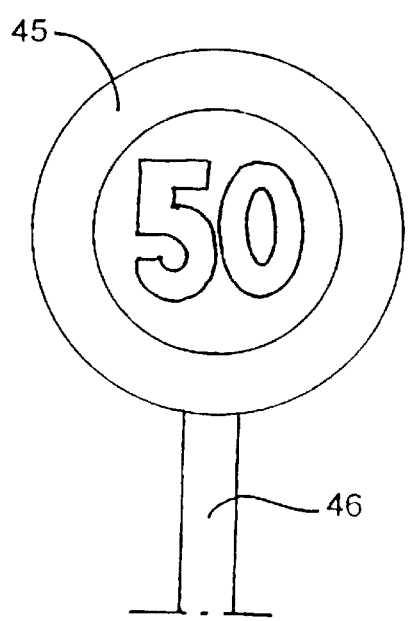
FIG. 23 is a front view of a traffic sign manufactured according to the present invention.

FIGS. 23 and 24 show a disc-shaped traffic sign 45 manufactured according to the present invention and fastened to its shaft 46. The sign 45 comprises at its back radially extending reinforcing ribs 47, which can be produced by roll forming carried out e.g. in accordance with FIG. 1. In FIG. 243, the sign 45 is attached to the shaft 46 with a bolt 48, the fasteners 49 of which can also be produced in connection with said roll forming.

A globe for a street light mentioned above may be manufactured in accordance with FIG. 1 by roll forming a disc-shaped piece of plate, which then is turned or deep-drawn to its final form.

It is obvious for one skilled in the art that various embodiments of the invention are not limited to those examples presented, but that modifications are possible within the scope of the attached claims. For example, instead of pressure turning, a roll formed piece of plate may be formed to a utensil also by deep drawing. In this case it is possible that markings or patterns are provided to the bottom of the utensil still at the deep drawing stage without changing the basic shape of the bottom.

While cutting the blank 3, the cutting direction of the cutting blade 2 deviates slightly from the perpendicular direction of FIG. 11 even if the rod were of elliptical cross-section.

The right cutting direction of the blade for providing a circular, disc-shaped blank depends e.g. on the shape and cutting angle of the cutting blade and the thickness of the blank to be cut, and for one skilled in the art, it is in each case easily definable by testing.

What is claimed is:

1. A method for the manufacture of a formed piece of aluminum, or relatively soft metal, the method comprising:
   cutting a slice from a raw-cast rod of said metal, wherein the slice is cut so that the cut profile of the rod is elliptical in shape and in the direction of the great axis of the ellipse so that the detaching blank is formed substantially circular because of the flattening of the metal in the cutting direction; and
   roll forming the blank by placing it on a mould tool rotating about its axis (4) to rotate with the said tool, and by forming the blank from its opposite side with a roll forming tool rotating about its axis (6) inclined to the axis of the mould tool, which is in linear rolling contact with the blank, the blank being formed between the opposite rotating tools substantially to a disc-shaped piece of plate.

2. A method according to claim 1, wherein the blank is roll formed principally between a mould tool with a planar mould surface and a roll forming tool with a conical surface.

3. A method according to claim 1, wherein the formed disc-shaped piece is patterned in connection with roll forming either from one side or both sides with the help of elevations and/or recesses on the mould surface of the mould tool and/or on the rolling surface of the roll forming tool.

4. A method according to claim 3, wherein radial reinforcing ribs are provided either to one side or both sides of the piece thus formed during roll forming.

5. A method according to claim 1, wherein the blank is cut from a raw-cast, unrolled metal rod of circular or elliptical cross-section.

6. A method according to claim 5, wherein the blank is cut from a metal rod circular cross-section by directing a cutting tool to it obliquely to the axial direction of the rod, and the detaching blank is formed substantially circular because of the flattening of the metal in the cutting direction.

7. A method according to claim 6, wherein the rod is supported on the side of the end to be cut off with a sleeve-like casing surrounding the rod.

8. A method according to claim 6, wherein, at the final stage of movement of the cutting blade, the cutting is directed with the help of stopping pieces pressed against the sides of the blank detaching from the rod.

9. A method according to claim 6, wherein the blank detaching from the end of the rod during cutting is allowed to be pressed between the cutting blade and a wall perpendicular to the rod in order to straighten the blank.

10. A method according to claim 5, wherein the blank cut from a metal rod of elliptical cross-section by directing a cutting tool to it perpendicularly to the axis of the rod from the direction of the great axis (30) of the ellipse, and the detaching blank is formed substantially circular because of the flattening of the metal in the cutting direction.

11. A method according to claim 1, wherein a disc-shaped piece of plate is roll formed to be used as the bottom of a cooking utensil and it is fastened by pressing.

12. A method according to claim 11, wherein a magnetic, induction-heatable metal part is placed against the blank, which metal part integrates with the bottom of the cooking utensil during roll forming.

13. A method according to claim 1, wherein a disc-shaped piece of plate is roll formed so that its centre forms a bottom of a cooking utensil, whereafter a collar surrounding the centre part of the piece is bent by turning to form upwards rising sides of the utensil.

14. A method according to claim 1, wherein a disc-shaped piece of plate is roll formed, and then turned or deep-drawn to form a globe of a lamp.

15. A method according to claim 1, wherein a disc-shaped piece of plate is roll formed, and it is used as a traffic sign.

16. A method according to claim 1, wherein a disc-shaped piece of plate is roll formed and used as a lid for a can.

* * * * *